United States Patent [19]

Szczepanik

[11] Patent Number: 4,902,427

[45] Date of Patent: Feb. 20, 1990

[54] FILTER FOR REMOVING HEAVY METALS FROM DRINKING WATER

[75] Inventor: Michael F. Szczepanik, Melvindale, Mich.

[73] Assignee: Ebonex Corporation, Melvindale, Mich.

[21] Appl. No.: 185,799

[22] Filed: Apr. 25, 1988

[51] Int. Cl.$^4$ .................. B01D 23/14; B01D 29/48
[52] U.S. Cl. .................. 210/484; 210/497.1; 210/502.1; 210/505; 210/912
[58] Field of Search .......... 210/259, 266, 282, 321.78, 210/321.83, 460, 484, 494.1, 497.01, 505, 541, 684, 688, 694, 133, 502.1, 673, 167, 660, 691, 169; 502/80, 516, 62; 570/239; 423/25

[56] References Cited
U.S. PATENT DOCUMENTS 4,402,830  9/1983  Pall ........................................ 210/505
4,783,259 11/1988  Wade ...................................... 210/169
4,789,475 12/1988  Harte et al. ......................... 210/502.1

Primary Examiner—Richard V. Fisher
Assistant Examiner—Joseph Drodge
Attorney, Agent, or Firm—Krass & Young

[57] ABSTRACT

A filter for reducing heavy metals in water employs particulate boneblack (bone char) material as a filtration agent. A layer of boneblack (bone char) impregnated filter material and a layer of fibrous substrate are helically interwound around a hollow, porous central core to form the cartridge elements of a filter cartridge designed to reduce heavy metal concentrations in drinking water. A porous outer cage encloses the helically wound layers, and end caps are bonded to the cartridge elements at each end thereof. Methods of using boneblack particles to reduce heavy metal concentrations in water are also disclosed.

3 Claims, 1 Drawing Sheet

FILTER FOR REMOVING HEAVY METALS FROM DRINKING WATER

BACKGROUND OF THE INVENTION

The present invention relates to a filter for removing heavy metals from drinking water and, more particularly, to such a filter which utilizes bone charcoal as a filter medium.

DESCRIPTION OF THE RELEVANT PRIOR ART

The problem of securing a supply of drinking water free of undesirable contaminants has become particularly acute in recent years. Such contaminants may include both disease causing organisms, as well as various types of toxic chemicals such as toxic solvents, pesticides residues, complex organic chemicals, and heavy metals. Heavy metal contamination of drinking water supplies has become of particular concern in recent years due to the accelerated pace of industrialization.

Contamination of drinking water with heavy metals such as lead, cadmium, and mercury is known to cause widespread detrimental effects on the population serviced by the drinking water supply, such detrimental effects including long term, crippling nerve, muscle and bone degeneration, impaired liver and kidney function, and metal retardation and delayed development in young children, who are particularly susceptible to heavy metal poisoning. Mercury is a known neurotoxin and lead is both tenatogenic and mutagenic. In response to these known detrimental effects of heavy metal poisoning, various governmental agencies and health organizations have either established or are in the process of establishing guidelines and quotas on the percentages of various heavy metals permitted to be present in drinking water supplies. For example, the World Health Organization has already established such limits and the U.S. Environmental Protection Agency is in the process of establishing quotas.

A corollary problem is that of removing heavy metals from waste water. Waste water generated by industrial processes frequently contains significant concentrations of various heavy metals, which may be used in the processing of materials or may be byproducts therefrom. Obviously, returning heavy metal contaminated waste water to the water supply is unacceptable from a health standpoint.

In the face of this ever increasing menace to public health, various methods for removing heavy metal contamination from drinking water and waste water have been devised. Most practical systems involve ion exchange resins or membrane separation techniques, such as reverse osmosis. Unfortunately, widespread use of ion exchange and membrane separation systems is prohibitive due to their high cost.

Activated carbon has long been known as a useful material for filtering and purifying drinking water. It is particularly useful for removing such contaminants as chlorine and organic compounds from water supplies. Due to its low cost, it has gained widespread acceptance as a water purifier in many types of water filtration systems, including industrial, municipal and domestic. For example, activated carbon prefilters are commonly employed in conjunction with water softeners for treating well water for domestic use. Also, units for purifying water directly from the tap, which are commonly found in both under the counter and faucet installed modes, frequently employ activated carbon as the sole filtration agent, or in combination with other water treatment methods. For examples of such tap water purification devices see U.S. Pat. Nos.: 4,094,779; 4,556,484; 4,609,466; 4,670,144; and 4,713,175.

While water purification systems employing activated carbon are useful for removing certain contaminants, unfortunately, activated carbon cannot be used to reduce the concentration of heavy metals in water. Hence, in order to provide complete filtration and purification of the water supply, it has become common practice to combine the use of activated carbon filters with other methods, such as ion exchange units, which do remove or reduce heavy metal concentrations. The above referenced U.S. Pat. No. 4,713,175 discloses one such combination device which may be mounted onto a sink faucet. However, while such systems may effectively remove both heavy metal contaminants and other types of pollution, again, these systems are complicated and costly, which prohibits their widespread use.

The residue remaining after animal bones are kilned is variously known as bone char, bone charcoal, or boneblack. Bone char is a two-component material comprised of a porous carbon surface and a porous hydroxyapatite lattice, both of which are particularly suitable for absorption. Hence, it is not too surprising that bone char has been used as a filtering or purification agent for treating a variety of liquids. For example, U.S. Pat. Nos. 3,309,166 and 3,316,055 disclose the use of bone char to purify used dry cleaning solvents. U.S. Pat. No. 3,179,160 discloses a method of treating underground gas and oil wells with a sorbent comprising, among many other agents, bone char. In U.S. Pat. No. 4,626,359, a deep bed filter which utilizes a layer of bone char and a layer of sand is disclosed which is particularly useful in sugar refining. However, none of the listed patents disclose or suggest the use of boneblack as a filtration material for removing heavy metal contamination from water supplies.

It has been unexpectedly found that boneblack may be used as a filtration material to remove heavy metal contamination from both drinking water supplies and from waste water. In water filtration tests conducted with various grades of boneblack, it has been found that boneblack particles can reduce lead concentrations initially present in water supplies in the range of 2 to 300 parts per million to as low as 1 part per million or less. Cadmium concentrations of around 50 parts per million have been reduced to less than 1 part per million. Mercury contamination of around 50 parts per million has been reduced to 0.1 parts per million. The boneblack filters used in these tests were comprised of standard grades of particulate boneblack, which is readily and easily available.

It would be desirable to provide a device for and a method of removing or reducing the concentrations of heavy metals from water supplies which is easy to construct, simple to operate and utilizes relatively inexpensive materials.

It would be highly desirable to employ such a system and method which does not necessitate the use of complex technologies and expensive materials.

It would be highly desirable to provide such a method and system which is simple and inexpensive enough for both municipal and individual use, and which may be used in conjuction with existing water purification systems.

SUMMARY OF THE INVENTION

Disclosed and claimed herein is a filter for reducing or eliminating concentrations of undesirable heavy metals in water supplies. The filter includes a means for introducing a stream of unfiltered water into the filter, filter material comprised of particulate bone char, means for selectively retaining the particles of bone char while permitting the passage therethrough of the stream of water, and means for removing the filtered water from the filter.

The particulate bone char comprising the filter material of the instant invention may be of two commercially available grades. Virgin bone char is material newly carbonized from the bones of animals and is particularly efficacious in filtering out undesirable heavy metals such as lead, cadmium and mercury when it is of a particulate size commonly referred to as 30 by 90 mesh. The second grade of commercially available bone char, which is commonly referred to as "spent" bone char, also maybe utilized in the filter of the instant invention, but it has been found that it must be of a finer particulate size than the virgin bone char in order to effectively remove heavy metals from waste water. Accordingly, it is contemplated that the spent bone char be provided as particles of a minimum fineness of no larger than 200 mesh. Both grades of bone char are commercially available from the assignee of the instant invention, the Ebonex Corporation of Melvindale Michigan.

In a particularly preferred embodiment of the instant invention, the boneblack filter provided as a filter cartridge suitable for insertion in existing systems, one embodiment of the filter cartridge is comprised of concentrically aligned cartridge elements and end caps bonded to each end of the cartridge elements. The cartridge elements include a hollow, porous central core, a fibrous substrate and a bone char impregnated filter layer helically wound around the central core, and a porous outer cage. Such a cartridge finds particular utility as a prefilter for water softener systems, or as a cartridge element to be used in under-the-counter or faucet mounted water purifying devices, in a manner well known in the art. By use of such a cartridge in home water purifying systems, such systems can routinely operate to remove heavy metal contamination from drinking water supplies in a manner heretofore only possible with expensive ion exchange or reverse osmosis units.

It is contemplated the cartridge of the instant invention will be employed in a prior art system in which a flowing stream of unfiltered water is directed onto the outer perimeter of the cartridge. The unfiltered water will first pass through the porous outer cage, and then through successive layers of the bone char impregnated filter layers and the fibrous substrate. The fibrous substrate acts as a separator in order to provide a multilayer structure for more efficient filtration, and to minimize channeling of the filtration material. After the stream of water has passed through the alternating filter and substrate layers, it passes through the porous central core and, since the central core is hollow, out one or more ends of the filter cartridge depending on the design of the system. The stream of water so filtered will exhibit greatly reduced concentrations of toxic heavy metals, which may be even eliminated altogether depending on the efficiency of the particular system in which the cartridge is utilized.

A method of using the bone char heavy metal filter of the instant invention is also contemplated. The method comprises the steps of first providing a filter comprised of bone char particulate filter material and a means for selectively retaining the particles of bone char while permitting the passage of a flow of unfiltered water therethrough. A stream of unfiltered water is then passed through the filter and collected after it has passed therethrough as a filtered, drinking water product.

Alternatively, heavy metal contamination of waste water may be effectively eliminated by mixing the waste water with very fine particles of bone black (200 mesh or finer). This produces a slurry which is allowed to stand for a period of time (0.5 to 2 hours). The slurry is then poured thorugh a filter to remove the boneblack particles, thus leaving a purified waste water product.

BRIEF DESCRIPTION OF THE DRAWINGS

The various features, uses and advantages of the herein invention may best be understood with reference to the following detailed description and drawings in which.

DETAILED DESCRIPTION OF THE PREFERRED EMBODIMENTS

Figure 1:
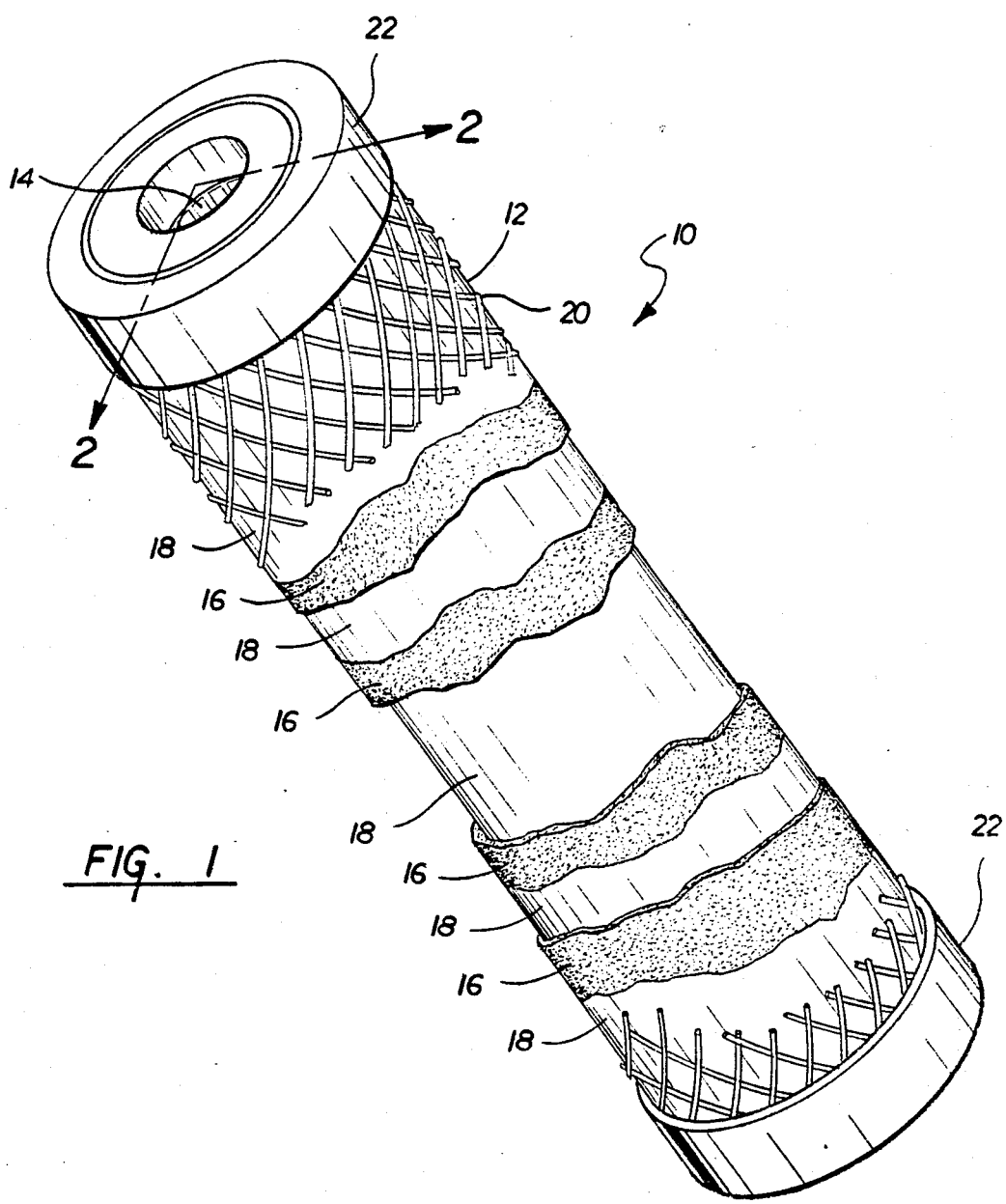
FIG. 1 is a perspective side view of a filter element constructed in accordance with the principles of the instant invention, said filter cartridge being partially cutaway to show the construction thereof.

In the following detailed description and drawing, like reference numerals are used to refer to the same element of the invention shown in multiple figures thereof.

Referring now to the drawings, and in particular to FIG. 1, there is shown a filter cartridge 10 comprised of filter elements 12 and end caps 22 bonded to both ends thereof. The filter elements 12 include a hollow, porous central core 14, with a fibrous substrate 18 and a bone char impregnated filter layer 16 helically wound around central core 14. A porous outer cage 20 serves to retain the outermost filter layer 20 while permitting passage of water therethrough into the filter 10. Preferably, the various cartridge elements 12 are fabricated of inexpensive, readily available materials. For example, the hollow central core 14 may be fabricated of a flexible polymeric material, such as polyethylene, provided in a grid form with openings therebetween the permit the passage therethrough of filtered water. Similarly, the porous outer cage may be fabricated of a polymeric net material, such as nylon net, or polyethylene net. Both the fibrous substrate 18 and the filter layer 16 may be comprised of any suitable, nonwoven porous material. The material of which the filter layer 16 is comprised should have the characteristic of being able to be thoroughly and easily impregnated with the boneblack particulate material. Numerous materials having the desirable characteristics are known in the prior art.

Figure 2:
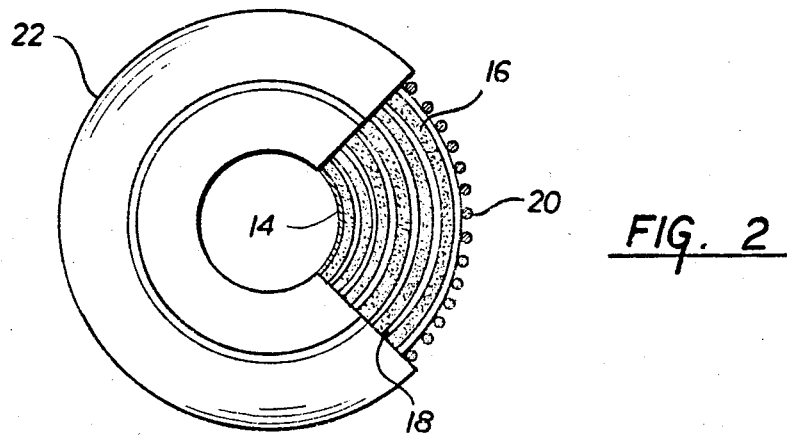
FIG. 2 is a partial cross section of the filter cartridge of FIG. 1 taken along lines 2—2.

In FIG. 2, a part cross-sectional view of the filter cartridge 10 of FIG. 1, the effect of the helical winding of the substrate 18 and the filter layer 16 can be seen in the layered structure illustrated. The arrows indicate the direction of water flow, although obviously, flow may be in the reverse direction without detriment. Unfiltered water first passes through outer cage 20, then through successive layers of fibrous substrate 18 and filter layer 16. Due to the multilayered structure, excessive channeling caused by flow of the water through the filter medium is reduced. After having passed through the successive layers of filter, the now filtered water passes finally through central core 14 and into the hollow center of the filter cartridge. It may then be drawn off as filtered water, in a manner known in the art.

While a particular arrangement of elements is depicted in the filter cartridge 10 shown in FIGS. 1 and 2, it is to be understood that the principals of the instant invention may be used with a wide variety of filtration systems, and on other designs of filter cartridges. For example, the end caps 22 could be constructed so as to have hubs or projections which engage cartridge-retaining elements within the water filtration system. In another embodiment, the filter cartridge may be open at only one end, instead of two ends as depicted in FIGS. 1 and 2. Obviously, the design of the particular filter cartridge will depend on the system in which it is being utilized. Furthermore, the principles of the instant invention encompass water filters which are not of the cartridge type, but may employ one or more filter beds of boneblack particles or boneblack impregnated particles of other material.

EXAMPLES

Water filtration tests were performed on various samples of water contaminated with lead, cadmium, and mercury. Tests were performed using both virgin boneblack of 30–90 mesh, and spent boneblack of various degrees of fineness. The water filtration tests were performed by the Waste Water Analysis Corporation of Lincoln Park, Michigan. The protocol used in the performance of the tests is set out in the reference work, "Standard Methods for the Examination of Water and Waste Water," 16th Ed. The results are set out in the following tabular form:

TABLE I

| Sample No. | Lead PPM | Cadmium PPM | Mercury PPM |
| --- | --- | --- | --- |
| 1 distilled water + Pb, Cd, Hg | 237.93 | 51.68 | 47.95 |
| 2 distilled water-virgo 20 grms. (30 × 90) drip | .71 | 1.33 | (−) .10 |
| 3 distilled water-ret. 10 grms. virg. fines-1 hr. | 1.00 | 0.22 | (−) .10 |
| 4 well water + Pb, Cd, Hg | 206.89 | 51.12 | 46.16 |
| 5 well water-virg. 20 grms. (30 × 90) drip | 1.43 | (−) .05 | (−) .10 |
| 6 well water-ret. | 1.43 | 0.22 | (−) .10 |
| | | Copper | |
| X wastewater sample from wastewater analysis | 15.62 | 16.00 | |
| 7 after 2% virg. 30 × 90 return - 1 hr. contact | 1.23 | (−) 1 PPM | |
| 8 after 1% virg. 30 × 90 return - 1 hr. contact | 2.76 | (−) 1 PPM | |

TABLE I-continued

| Sample No. | Lead PPM | | Mercury PPM |
| --- | --- | --- | --- |
| A control same as sample #1 | 237.93 | 51.68 | 47.95 |
| 9 coarse amstar spent as is (2% drip) 20 grms. | 70.00 | 21.935 | 33.360 |
| 10 fine amstar spent as is (1% - 1 hr. contact) | 35.454 | 18.387 | 3.227 |
| 11 ground amstar return (spent) (1% - 1 hr. contact) | 1.364 | 2.903 | 1.957 |

The following table sets out the concentrations of lead, cadmium and mercury expressed in parts per million for each of the first six samples of Table I in tabularized form:

TABLE II

| | Lead PPM | Cadmium PPM | Mercury PPM |
| --- | --- | --- | --- |
| No. 1 | 237.93 | 51.68 | 47.95 |
| No. 2 | 0.71 | 1.33 | <0.10 |
| No. 3 | 1.00 | 0.22 | <0.10 |
| No. 4 | 206.89 | 51.12 | 46.16 |
| No. 5 | 1.43 | <0.05 | <0.10 |
| No. 6 | 1.43 | 0.22 | <0.10 |

Note: "<" denotes less than.

As can be seen from the results summarized in the Tables, the filters utilizing boneblack particulate material are highly efficacious in reducing concentrations of heavy metals. For example, the lead concentration of 237.93 parts per million of sample No. 1 was reduced to 0.71 parts per million and 1.00 parts per million in, respectively, samples No. 2 and 3. Both samples No. 2 and 3 employed filtration through virgin boneblack. Sample No. 4 was a sample of well water with contaminants added and had an initial lead concentration of 206.89 ppm. This level was reduced to 1.43 ppm in both sample Nos. 5 and 6, which also utilized virgin boneblack.

With regard to cadmium concentrations, Table II reveals that unfiltered samples No. 1 and 4 contained cadmium concentrations, respectively, of 51.68 ppm and 51.12 ppm. These concentrations were reduced to 1.33 ppm and 0.22 ppm and less than 0.05 ppm and 0.22 ppm, respectively, when samples No. 1 and 4 were filtered through virgin boneblack.

Similarly, the mercury concentrations of 47.95 and 46.16 ppm of samples No. 1 and 4 were reduced to less than 0.10 ppm in all the filtered samples.

It can be seen from the results presented in these two tables that filtration of heavy metal contaminated water through particulate boneblack material greatly reduced concentrations of lead, cadmium and mercury to relatively insignificant levels. Even filtration with spent boneblack material can significantly reduce concentrations, as can be seen in Table I, and if the spent boneblack is fine enough, as in sample No. 11, its effectiveness in reducing concentrations can be significant, and, with regard to lead concentrations, equally as good as the virgin material. As mentioned previously, standard activated charcoal filter media have little effect on heavy metal contaminant concentrated in water.

The disclosure of the herein invention has been with reference to certain embodiments, exemplifications and illustrative examples thereof. Doubtless, by using the teachings of the instant invention, one skilled in the art may be able to construct other exemplifications and embodiments which do not deviate from the spirit of the teachings of the present invention. Hence, the scope of the herein invention is not limited solely to the embodiments, exemplifications and illustrative examples discussed herein, but rather solely by the claims appended hereto.

I claim:

1. A filter cartridge for removing heavy metals from water comprising:
    a hollow, porous central core;
    means for absorbing heavy metal comprising a fibrous substrate and a bone char impregnated filter layer helically interwound around said central core so as to form a generally cylindrical filter element;
    a porous outer cage disposed about at least a portion of said filter element distal said core; and
    an end cap bonded to each end of the filter element, at least one of said end caps having an opening therethrough for establishing fluid communication with the central core.

2. The filter cartridge of claim 1 wherein the bone char is virgin bone char with a particle size of at least as fine as 30 by 90 mesh.

3. The filter cartridge of claim 1 wherein the bone char is spent material having a particle size of at least as fine as 200 mesh.

* * * * *